(12) United States Patent
Ikeda

(10) Patent No.: US 7,460,066 B2
(45) Date of Patent: *Dec. 2, 2008

(54) POSITIONING SYSTEM

(75) Inventor: Masayuki Ikeda, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/011,361

(22) Filed: Jan. 25, 2008

(65) Prior Publication Data

US 2008/0129590 A1 Jun. 5, 2008

Related U.S. Application Data

(62) Division of application No. 11/609,048, filed on Dec. 11, 2006, now Pat. No. 7,348,920, which is a division of application No. 10/780,288, filed on Feb. 17, 2004, now Pat. No. 7,277,050.

(30) Foreign Application Priority Data

Feb. 28, 2003 (JP) ............................. 2003-054021
Feb. 6, 2004 (JP) ............................. 2004-031058

(51) Int. Cl.
G01S 5/14 (2006.01)
G01S 3/02 (2006.01)
H04Q 7/20 (2006.01)

(52) U.S. Cl. ..................... 342/357.14; 342/357.09; 342/357.1; 342/463

(58) Field of Classification Search ................ 342/357.06–357.07, 357.09, 357.1, 357.14, 342/357.15, 463–465
See application file for complete search history.

(56) References Cited

U.S. PATENT DOCUMENTS

| | | | |
|---|---|---|---|
| 6,204,808 B1 | 3/2001 | Bloebaum et al. |
| 6,285,316 B1 | 9/2001 | Nir et al. |
| 6,353,412 B1 | 3/2002 | Soliman |
| 6,433,739 B1 | 8/2002 | Soliman |

(Continued)

FOREIGN PATENT DOCUMENTS

WO    WO 02/15612    2/2002

(Continued)

OTHER PUBLICATIONS

3rd Genereation Partnership Project; Technical Specification Group Radio Access Network; State 2 functional specification of User Equipment (UE) positioning in UTRAN (Release 5).

(Continued)

*Primary Examiner*—Thomas H. Tarcza
*Assistant Examiner*—Fred H. Mull
(74) *Attorney, Agent, or Firm*—Harness, Dickey & Pierce, P.L.C.

(57) ABSTRACT

A positioning system is provided having a first signal source for originating synchronous signals, and a second signal source for originating a signal which is not synchronous with the signal from the first signal source. The system determines, based on a signal propagation time and signal propagation speed from the first or second signal source, the distance to this signal source so as to determine a position of a receiving point.

11 Claims, 2 Drawing Sheets

U.S. PATENT DOCUMENTS

| | | |
|---|---|---|
| 6,445,927 B1 | 9/2002 | King et al. |
| 6,473,030 B1 | 10/2002 | McBurney et al. |
| 6,665,541 B1 | 12/2003 | Krasner et al. |
| 6,748,202 B2 | 6/2004 | Syrjärinne et al. |
| 2002/0183076 A1 | 12/2002 | Pande et al. |
| 2003/0016167 A1 | 1/2003 | Dooley et al. |
| 2004/0189515 A1 | 9/2004 | Vanucci |

FOREIGN PATENT DOCUMENTS

| | | |
|---|---|---|
| WO | WO 02/068985 | 9/2002 |
| WO | WO 02/075349 | 9/2002 |
| WO | WO 02/098024 | 12/2002 |
| WO | WO 03/051070 | 6/2003 |

OTHER PUBLICATIONS

Article by P.J. Duffett-Smith, P. Hansen, Title: Precise Time Transfer in a Mobile Radio Terminal;. 6 pages.

Analysis of GPS Time-Transfer Accuracy in GSM and UMTS Networks and Possibilities to Improve Sensitivity, ION GPS 2002, Sep. 24-27, 2002, Portland OR (pp. 184-191).

Communication from Japanese Patent Office regarding counterpart application.

POSITIONING SYSTEM

RELATED APPLICATIONS

Cross-Reference To Related Applications

This application is a divisional of U.S. Ser. No. 11/609,048 filed Dec. 11, 2006, now U.S. Pat. No. 7,348,902 B2, which is a divisional of U.S. Ser. No. 10/780,288 filed Feb. 17, 2004, now U.S. Pat. No. 7,277,050, issued Oct. 2, 2007, both claiming priority to Japanese Application No. 2003-054021 filed Feb. 28, 2003 and Japanese Application No. 2004-031058 filed Feb. 6, 2004, all of which are hereby incorporated by reference.

BACKGROUND OF THE INVENTION

1. Technical Field

The present invention relates to a positioning system for use in GPS (Global Positioning Systems) assisted with mobile telephone networks for positioning.

2. Description of the Related Art

Global positioning systems, or GPS, have been available. In GPS, signals sent from satellites are received to determine the distance to the satellites to determine the position of the receiving point. In GPS, therefore, it is necessary to determine the position and time at which the satellites sent the signals. Satellite position information is sent from the satellites as almanac and ephemeris information, and can be acquired by picking up the signal from the satellites; however, it takes about 15 minutes to receive all of the information. Since it is difficult to supply accurate time information, generally, signals from four satellites are received to determine the position and time by solving simultaneous equations with four unknowns, that is, three-dimensional position coordinates and time. In the related art, there has been a network-assisted GPS in which information necessary for positioning, such as satellite position information and time information, is obtained not via satellite signals but via information in another way, such as a mobile telephone network, so as to greatly improve the positioning time and accuracy. Network-assisted GPS positioning of WCDMA mobile phones has been standardized by the 3GPP (Third Generation Partnership Project) (see 3GPP Specification TS25.305 V5.4.0).

In GPS, it is necessary to receive at least four satellite signals in order to detect the three coordinates of position, i.e., latitude, longitude, and altitude, and the time, or to receive at least three satellite signals, assuming that the altitude is ground level, in order to detect the two coordinates of position, i.e., latitude and longitude, and the time. In bad visibility conditions for satellites, such as indoors or between buildings in cities, a required number of satellite signals are not necessarily receivable. In order to overcome such a situation, a positioning technology in which radio signals from telephone-network base stations are used as satellite signals is known, and is standardized as OTDOA (Observed Time Difference Of Arrival) positioning technology, as shown in 3GPP Specification TS25.305 V5.4.0. FIG. 3 is a diagram showing the principle of a typical network-assisted GPS specified in 3GPP Specification TS25.305 V5.4.0. An SAS (Stand Alone Serving Mobile Location Center) 12 receives GPS satellite signals to obtain almanac and ephemeris data necessary for detecting the position. The position of the SAS 12 is known, and the SAS 12 can further generate data for correcting positioning errors from the difference between the known position and the positioning result from the GPS signals. In some cases, the SAS 12 also provides a portion of the SMLC (Serving Location Center) functionality, which should be performed by an RNC (Radio Network Controller) 13a. The RNC 13a controls a base station 15a to perform sequence control or radio resource management necessary for positioning. The RNC 13a specifies necessary assistance data from the SAS 12 based on positioning capabilities of the UE (User Equipment) to be measured, and sends it to a UE 16 via the base station 15a according to the positioning sequence. The timing necessary for UE positioning can be determined using a pilot signal or the like sent from the base station 15a. In WCDMA, base stations and GPS satellites are not generally synchronous, and an LMU (Location Measurement Unit) installed in each base station measures the deviation from the GPS time. There are two types of LMUs, that is, type A for connection with the base station by air, and type B for connection with the base station via a line.

Therefore, in such a typical network-assisted GPS using WCDMA mobile telephone networks, a device (LMU) for measuring a time difference between a signal sent from a radio-access-network base station and a signal sent from a GPS satellite, which have no synchronous relation therebetween, is essential in each base station.

Typically, in OTDOA technology, since signals from base stations are not synchronous, the timing difference between the base stations must be measured by some method. Thus, an LMU is also required for each base station in order to detect the timing difference of signals between the base stations.

It is an object of the present invention for the base station to provide a low-cost and high-reliability positioning system capable of precisely providing time to the positioning target UE and of OTDOA positioning in asynchronous WCDMA mobile telephone networks without installing an LMU in each base station.

It is another object of the present invention to provide a positioning system capable of short-time and high-accuracy positioning without an LMU.

SUMMARY

A positioning system of the present invention having one or a plurality of first signal sources (GPS satellites) for originating synchronous signals, and one or a plurality of second signal sources (base stations), for originating signals which are not synchronous with the signals from the first signal sources, for originating a signal, for, based on a signal propagation time and signal propagation speed from the signal source, and determining the distance to the signal source based on a signal propagation time and a signal propagation speed from the signal source so as to determine a position of a receiving point includes a measurement device (a mobile terminal in good conditions) for receiving only the signal from the first signal source to determine a receiving position P (P is a vector quantity indicating the position coordinates) and time and for, based on the time, measuring a receiving time $T_R$ of a predetermined event of the signal from the second signal source, a control device for determining a signal propagation time t between the measurement device and the second signal source by calculating a relative distance $|P-Q|$ between the measurement device and the second signal source based on the receiving position P measured by the measurement device and a position Q (vector quantity) of the second signal source and by dividing the resulting distance by the signal propagation speed, and for determining a time $T_r$ at which the second signal source originates the predetermined event by solving $T_R-t$, a positioning terminal having a receiving device for receiving the signals from the first and second signal sources, and a communication device for performing communication between the control device and the positioning terminal, wherein the positioning terminal uses the time $T_t$ as a reference to receive the signal from the first signal source for positioning.

With this structure, the transmission timing of base-station signals is determined using a mobile terminal in good conditions, and the time is reported to the positioning target mobile terminal. This enables the positioning target mobile terminal to know the accurate time without an LMU for each base station, thus achieving an advantage that the positioning time can be reduced. No LMU is required, thus achieving another advantage that the system construction cost can be reduced.

Since the positioning target mobile terminal measures a receiving time of a predetermined signal from a base station, the distance from the positioning target mobile terminal to the base station can be determined based on the obtained value and the time $T_T$ determined by measurement of a mobile terminal in good conditions, thus achieving an advantage that the location can be determined even in case a required number of GPS satellites are invisible (e.g., unavailable due to weather, buildings, or the like).

DETAILED DESCRIPTION

An embodiment of the present invention is described hereinbelow with reference to the drawings.

Embodiment 1

Figure 1:
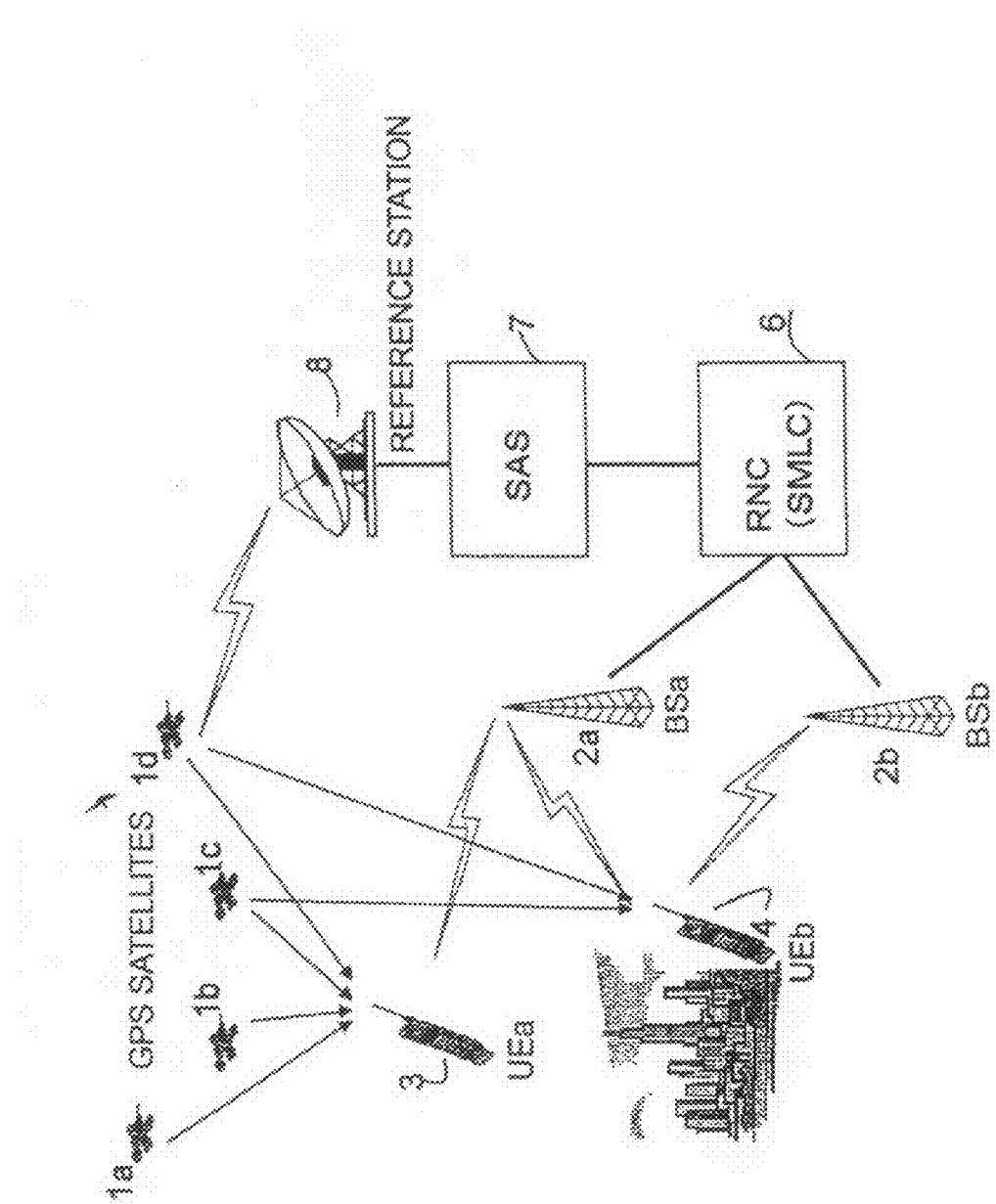
FIG. 1 is a diagram of a positioning system according to the present invention.

FIG. 1 is a diagram showing the main portion of a positioning system according to the present invention. A reference station 8 receives GPS satellite signals to obtain almanac and ephemeris data necessary for positioning.

Figure 2:
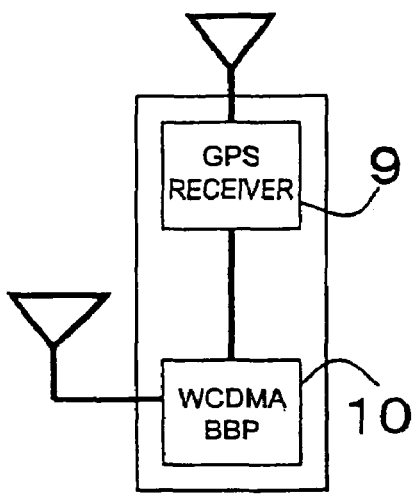
FIG. 2 is a block diagram of an UE for use in the positioning system according to the present invention.
Figure 3:
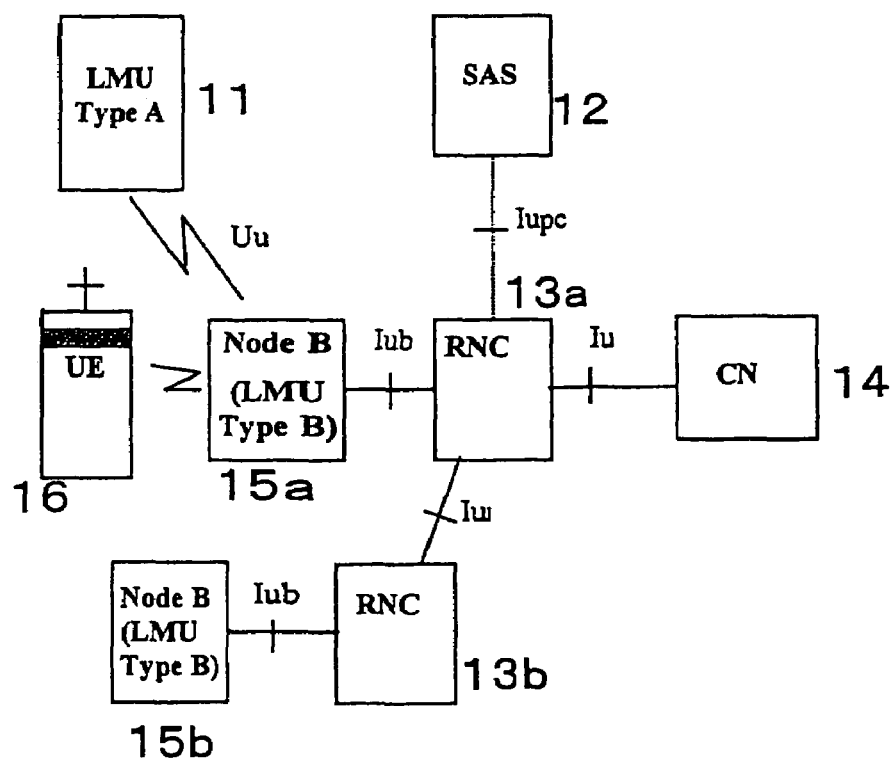
FIG. 3 is a diagram of a positioning system in a WCDMA mobile telephone system of the related art.

The position of the reference station 8 is known, and positioning correction data is generated by comparing this position and the positioning result obtained from the GPS signals. The obtained data is stored in an SAS 7. A UEa 3 is a terminal which knows the approximate position or time from the previous location data or which is in good conditions where signals from a sufficient number of satellites for positioning can be successfully picked up. An RNC 6 provides the SMLC functionality, and performs resource management or sequence control necessary for positioning. A UEb 4 is a target terminal for positioning. As shown in FIG. 2, each UE includes a GPS receiver 9 for receiving GPS signals, and a WCDMA baseband processor 10a for operating as a mobile phone.

The UEa 3 is a mobile terminal which allows its internal clock to be calibrated by a GPS time coordinated with an atomic clock, which is obtained from the previous positioning result, so as to know the accurate time, or which receives radio waves of satellites 1a, 1b, 1c, and 1d with sufficient signal strengths for stand-alone positioning if it does not know the accurate time. The RNC 6 regularly sends inquiries to the UEa 3 via a BSa (base station) 2a about the current position P and a GPS time $T_R$ at which a specific event of the signal sent from the BSa 2a is received, and calculates a GPS time $T_T$ at which the BSa 2a sent the specific event of the signal based on the result. It is desirable that the specific event generated from a base station be, for example, the transmission of a frame boundary or a specific system frame number (for example, system frame No. 0) of a pilot signal sent from a base station. In GPS, one-bit information is sent for every 20 milliseconds; whereas, a WCDMA frame is set to 10 milliseconds, thus facilitating calculation. Since every UE in a cell receives a pilot signal and knows the frame timing, no special signal is additionally required for positioning. The frame timing and/or the system frame number are passed from the WCDMA baseband processor 10 to the GPS receiver 9 shown in FIG. 2.

Calculation of the time $T_T$ from the time $T_R$ is carried out in the following way. The position Q of the BSa 2a is known. The calculation can be performed by solving the following relation equation:

$$T_T = T_R - |P-Q|/c \qquad (\text{Eq. 1})$$

where c indicates the velocity of light, and $|P-Q|$ indicates the distance between P and Q. The time determined by the following equation indicates the time necessary for a radio wave to propagate from the BSa 2a to the UEa 3:

$$t = |P-Q|/c \qquad (\text{Eq. 2})$$

Even if the UEa 3 is in good conditions, it requires more than ten minutes to obtain all almanac data and ephemeris data necessary for positioning from satellites, and this is not practical. In general, the assistance data stored in the SAS 7 is obtained via the RNC 6 for use.

Every UE retrieves base-station signals when it is powered on to determine which cell the UE is currently present in, and reports the result to the RNC 6. The RNC 6 therefore has a list of all UEs in each cell. The RNC 6 regularly sends inquiries for P and $T_R$ to the UEs in good conditions based on the list so that $T_T$ is constantly updated. Alternatively, a UE in good conditions may voluntarily report P and $T_R$ regularly. Usually, a plurality of UEs, not only one UE, are in good conditions, and the RNC 6 can use the reports from these terminals to very precisely determine $T_T$ using the least square method or the like.

The UEb 4 is a terminal in bad conditions, such as indoors or between buildings. In such conditions, high-sensitivity positioning can be realized by performing many calculations using satellite signals. However, unless the accurate time is known and the time when the calculation starts is limited to some extent, it takes a very long time until the signals are detectable. In this situation, positioning is impossible in effect. The UEb 4 is able to calculate approximate time from the pilot signal from the BSa 2a and $T_T$ determined by the RNC 6. The receiving time T at which the UEb 4 received the specific frame can be given by the following equation:

$$T = T_T + n \times 10 \text{ ms} + T_P \qquad (\text{Eq. 3})$$

where n denotes the number of frames sent from the BSa 2a after $T_T$ was observed until the UEb 4 receives this frame, and $T_P$ indicates the signal propagation time from the BSa 2a to the UEb 4. One frame period (10 ms) is controlled within ±0.05 ppm by the 3GPP standard, and the error is small if $T_T$ is updated frequently to some extent. $T_P$ cannot be identified, and is used as it is.

The UEb 4 limits a search window of the satellite signals based on the assistance data supplied from the SAS 7 via the RNC 6 and T to detect the signals for positioning.

The UEb 4 can receive three satellite signals and a base-station signal to obtain four simultaneous equations with unknowns, that is, the three-dimensional position of the UEb 4 and the time, and can know its position.

The UEb 4 can also receive two satellite signals and a base-station signal to obtain four simultaneous equations with unknowns, that is, the two-dimensional position of the UEb 4 and the time, and can know its position.

The UEb 4 can also receive two satellite signals and two base-station signals to obtain four simultaneous equations with unknowns, that is, the three-dimensional position of the UEb 4 and the time, and can know its position.

Likewise, if the sum of the received satellite and base-station signals is four, the UEb 4 can obtain four simultaneous equations with unknowns, that is, the three-dimensional position of the UEb 4 and the time, to know its position. If the sum of the received satellite and base-station signals is three, the UEb 4 can know the two-dimensional position and the time.

A base-station signal is not necessarily used as a reference, but, for example, a signal, such as a synchronous signal of television-station radio waves, may be used as a reference. This is advantageous particularly for the third generation multimedia-enhanced mobile terminals with a built-in TV receiver, which is one feature of third generation mobile phones.

ADVANTAGES

According to the present invention, the timing between base-station signals is measured by a mobile terminal. Therefore, in an asynchronous mobile-telephone-network system, base stations can report an accurate time to a positioning terminal via base-station signals without an LMU. The positioning terminal can use the time to realize short-time and high-accuracy positioning.

According to the present invention, furthermore, the timing between base-station signals is measured by a mobile terminal without using an LMU to determine the phases of the base-station signals. The base-station signals and GPS satellites can be used for positioning even in case a required number of GPS signals are not receivable.

What is claimed is:

1. A positioning system for determining a position of a positioning terminal, the system including a plurality of first signal sources each emitting a respective first signal, and one or more second signal sources each emitting a respective second signal, the first signals being synchronous with a reference time and the second signals being non-synchronous with the first signals, said system determining the position of the positioning terminal based on a signal propagation time and signal propagation speed of at least one of the first and second signal sources, said positioning system comprising:

a measurement device associated with each second signal source that receives the first signals from the first signal sources to determine a position P of the measurement device and a time of measurement when the measurement device receives the first signals and for, based on the time of measurement, measuring a receiving time (TR), based on the reference time, of a predetermined event of the second signals;

a control device that determines a signal propagation time (t) between the measurement device and its associated second signal source by calculating a relative distance |P−Q| between the measurement device and its associated second signal source based on the position P measured by the measurement device and a position Q of the second signal source and by dividing the resulting distance by the signal propagation speed, and that determines a time (TT), based on the reference time, at which the second signal source originates the predetermined event by solving TR−t;

the positioning terminal including a receiving device that receives signals from the first and second signal sources; and a communication device that communicates between the control device and the positioning terminal, wherein the communication device communicates the time TT to the positioning terminal, and wherein the positioning terminal receives the time TT from the communication device and uses the time TT to receive from among the first and second signals for determining the position of the positioning terminal.

2. The positioning system according to claim 1, wherein the first signal sources further comprise GPS satellites.

3. The positioning system according to claim 1, wherein the second signal sources further comprise base stations of a mobile communication network.

4. The positioning system according to claim 1, wherein the measurement device further comprises a mobile terminal in good condition, wherein the position P of the measurement device can be determined without accurate time information, and measures P and TR to voluntarily report the measured P and TR to the control device in the same mobile communication network.

5. The positioning system according to claim 1, wherein the measurement device further comprises a mobile terminal in good condition, where the position P of the measurement device can be determined without accurate time information, and measures P and TR according to a request from the control device in the same network to report the measured P and TR to the control device.

6. A positioning terminal for determining a position of the positioning terminal, the positioning terminal including a receiving device that receives signals from a plurality of first signal sources each emitting a respective first signal and one or more second signal sources each emitting a respective second signal, the first signals being synchronous with a reference time and the second signals being non-synchronous with the first signals, the system determining a position of the positioning terminal based on a signal propagation time and signal propagation speed of at least one of the first and second sources, said positioning terminal comprising:

a calculation device for calculating $$TT=TR-|P-Q|/c;$$

wherein the P is a position of a measurement device when the measurement device received the first signals from the first signal sources;

the Q is a position of the one second signal source;

the |P−Q| is a relative distance between the measurement device and the one second source;

the c is a signal propagation speed;

the TR is a receiving time, based on the reference time, when the measurement device received a predetermined event of the second signals at the position P;

wherein the positioning terminal uses the time TT to receive the signals from the first signal sources;

wherein the positioning terminal receives the first and second signals for determining the position of the positioning terminal.

7. The positioning terminal according to claim 6, wherein the first signal sources further comprise GPS satellites.

8. The positioning terminal according to claim 6, wherein the second signal sources further comprise base stations of a mobile communication network.

9. The positioning terminal according to claim 6:

wherein the measurement device further comprises a mobile terminal in good condition;

wherein the position P of the measurement device can be determined without accurate time information;

wherein the measurement device measures P and TR; and wherein the measurement device voluntarily reports the measured P and TR to the control device in the same mobile communication network.

10. The positioning terminal according to claim 6, wherein the measurement device further comprises a mobile terminal in good condition, where the position P of the measurement device can be determined without accurate time information, and measures P and TR according to a request from the control device in the same network to report the measured P and TR to the control device.

11. The positioning terminal according to claim 6, wherein the second signal sources further comprise television broadcast stations.

* * * * *

UNITED STATES PATENT AND TRADEMARK OFFICE
CERTIFICATE OF CORRECTION

PATENT NO. : 7,460,066 B2 Page 1 of 1
APPLICATION NO. : 12/011361
DATED : December 2, 2008
INVENTOR(S) : Masayuki Ikeda It is certified that error appears in the above-identified patent and that said Letters Patent is hereby corrected as shown below:

Column 1, Line 8: "7,348,902" should be --7,348,920--

Signed and Sealed this

Second Day of June, 2009

JOHN DOLL
*Acting Director of the United States Patent and Trademark Office*